Sept. 30, 1952        L. C. MILLER        2,612,140
FLUID DRIVEN ACTUATOR FOR TOOLS
Filed May 4, 1946        2 SHEETS—SHEET 1
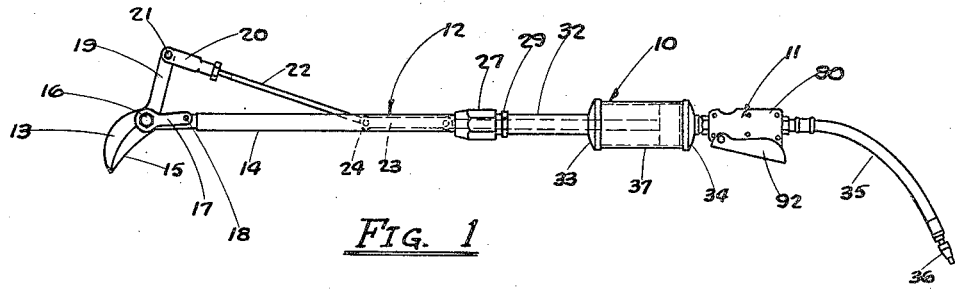
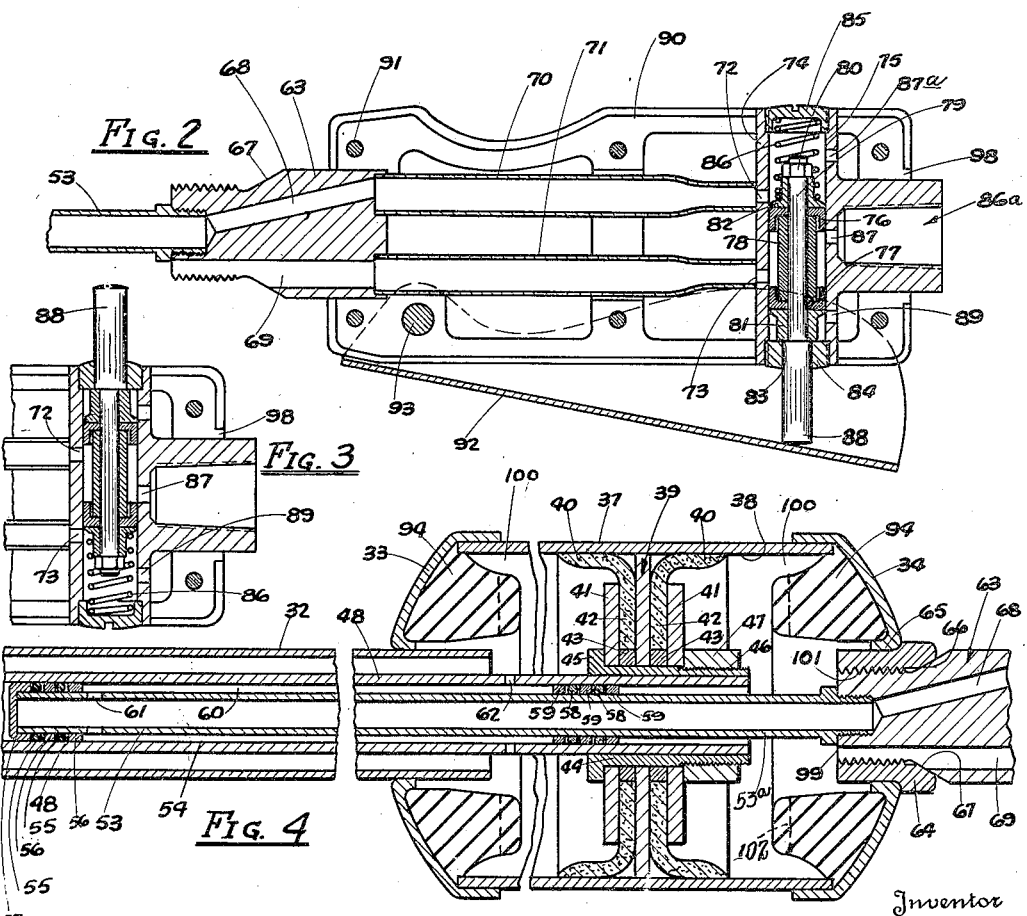
Inventor
LEONIDAS C. MILLER
By Lyon & Lyon
Attorneys Sept. 30, 1952 — L. C. MILLER — 2,612,140
FLUID DRIVEN ACTUATOR FOR TOOLS
Filed May 4, 1946 — 2 SHEETS—SHEET 2

Inventor
LEONIDAS C. MILLER
By Lyon & Lyon
Attorneys

Patented Sept. 30, 1952

2,612,140

UNITED STATES PATENT OFFICE 2,612,140

FLUID DRIVEN ACTUATOR FOR TOOLS

Leonidas C. Miller, Los Angeles, Calif.

Application May 4, 1946, Serial No. 667,320

13 Claims. (Cl. 121—38)

This invention relates to fluid driven actuating mechanisms and is particularly directed to an actuator adapted to impart reciprocating motion to a driven device. This invention finds particular usefulness as applied to a power cylinder having a reciprocable piston therein.

The principal object of this invention is to provide an improved fluid driven actuator in which pressure fluid is injected into a power cylinder axially of the piston therein, for moving the piston in either direction. Another object is to provide a device of this type having a novel form of fluid injection system. Another object is to provide an actuator of this type having a relatively stationary spear tube in telescopic relation with a hollow piston rod for injecting pressure fluid into the power cylinder.

Another object is to provide such a device in which the spear tube is insertable into the power cylinder through an axial opening and which carries axially spaced packing elements thereon. Another object is to provide a fluid driven actuator powered in both directions of reciprocable movement and yet presenting a smooth external surface free of tubes, piping, or the like. Another object is to provide a novel form of valve for controlling the operation of the actuator, which is readily operable irrespective of the orientation of the actuator in service. Another object is to provide a power operated tool embodying a preferred form of actuator, having an easily replaceable valve assembly. A further object is to provide such a device having a novel form of connection joint between the actuator and the power operated tool. Other objects and advantages will appear hereinafter.

In the drawings:

Figure 1 is a side view of a power operated pruning shear embodying my invention.

Figure 2 is a sectional side elevation showing the valve structures employed in the device shown in Figure 1.

Figure 3 is a partial view similar to Figure 2 illustrating a portion of the valve assembly inserted in reverse position.

Figure 4 is a longitudinal sectional view showing details of the construction of the power cylinder employed in connection with my invention.

Figure 5:
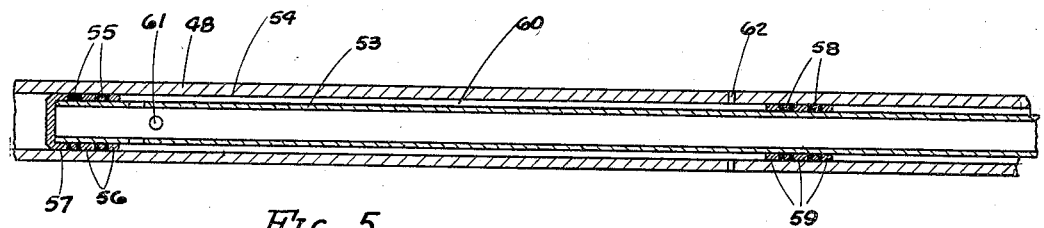
Figure 5 is a partial view of a longitudinal section illustrating a preferred arrangement of ports leading to the power cylinder.

Referring to the drawings, the fluid driven actuator generally designated 10 will be described in connection with a power operated pruning shear, but it is to be understood that this embodiment of my invention is set out only for purposes of illustration. It is contemplated that the fluid driven actuator employed in connection with the pruning shear will be particularly useful for other power driven devices operated by reciprocating motion. Furthermore, the pressure fluid used for operating the device will be described as air under pressure although it is recognized that any other pressure fluid, either a gas or a liquid, may be used with good results.

Figure 6:
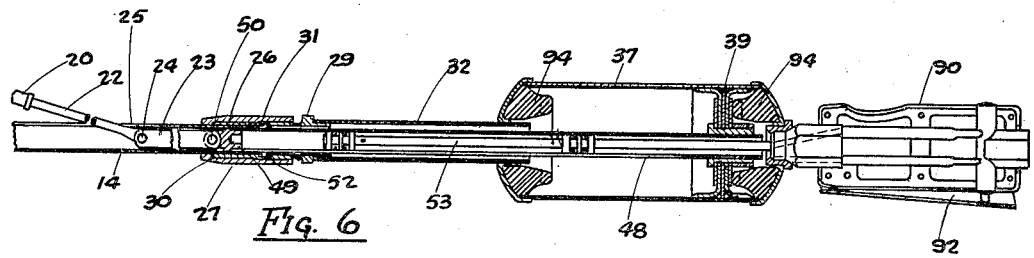
Figure 6 is a transverse sectional view of a device with the fluid driven piston in its fully retracted position.
Figure 7:
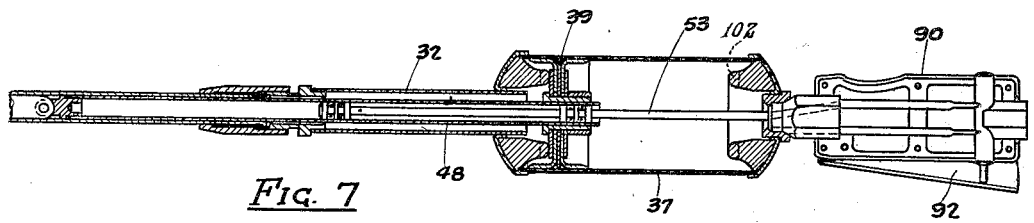
Figure 7 is a view similar to Figure 6 illustrating the piston in its fully advanced position.

The actuator assembly 10 which may be pneumatically driven, as set forth above, is operatively positioned between a valve assembly 11 and a pruning shear assembly generally designated 12. The pruning shear assembly 12 preferably comprises a stationary blade 13 secured to the end of a slotted tubular support 14. A movable blade 15 is pivotally connected to the stationary blade 13 by means of a pivot bolt 16. Means are provided for preventing turning movement of the bolt 16 under the influence of the moving blade 15, and as shown in Figure 1, this means may include a small box wrench 17 having its outer end secured to the stationary blade by means of a fastener element 18. A crank arm 19 formed integrally with the movable blade 15 is pivotally connected to a clevis 20 by means of a pin 21. An actuating arm 22 is threadedly connected with the clevis 20 at one end and at the other end is pivotally connected to a link 23 by a pivot pin 24 (see Figure 6). The actuating arm 22 extends through a slot 25 formed in the wall of the tubular support 14. The link 23 is preferably circular in cross section and is slidably received within the bore of a tubular member 14. The link therefore serves as a crosshead for operating the arm 22.

A collar 26 brazed on the inner end of the tubular support 14 is adapted to be received within the bore of the connecting nut 27. The nut 27 is adapted for threaded engagement within the external thread 28 on the terminal fitting 29. A tapered shoulder 30 on the nut 27 is adapted to engage the tapered end of the collar 26 and thereby clamp the collar 26 and tubular support 14 in operating position with respect to the terminal fitting 29. A retaining ring 31 may be interposed between the end of the tube 14 and the terminal fitting 29. The terminal fitting 29 is connected by an suitable means such as brazing to the outer end of a stationary sleeve 32. The inner end of the sleeve 32 is secured as by brazing to the front end flange 33 of the actuator assembly 10. The rear end flange 34 is connected to the valve assembly generally designated 11. A flexible hose 35 having a connection fitting 36 at its end is provided for delivering air under pressure to the valve assembly 11.

The actuator 10 includes a cylinder 37 positioned between and connected to the end flanges 33 and 34 by any convenient means such as brazing. Mounted for reciprocating motion within the bore 38 of the cylinder 37 is a piston generally designated 39. The piston comprises a pair of oppositely disposed cup elements 40 separated by a non-resilient spacer 39, and includes clamping plates 41 which grip the flanges 42 of the cup elements 40 to maintain them in operative position. Non-resilient washers 43 are provided radially inwardly of the flanges 42 for limiting the initial compression of the flanges 42 under the clamping action of the plates 41. The plates 41, spacer 39 and washers 43 are mounted on a hub 44, having a collar 45 at one end and a threaded section 46 on the other end. A clamping nut 47 engages the threads 46 and serves to clamp the plates 41, washers 43 and spacer 39 rigidly between the nut 47 and the collar 45.

The hub 44 is secured on one end of a hollow piston rod, or thrust tube 48, by any convenient means such as brazing. The thrust tube 48 extends axially of the cylinder 37 and axially of the extension sleeve 32, and carries at its projecting end a fitting 49 which is pivotally connected to the link 23 by means of a removable pin 50. The terminal fitting 29 is provided with a bearing 51 for slidable reception of a thrust tube 48. At the end of the bearing 51 and within the terminal fitting 29 is a seal ring 52. This seal ring may be formed of rubber or other distortable material and serves to prevent leakage of air from the chamber 100 within the cylinder 37 outwardly along the thrust tube 48. The seal ring 52 may be replaced by disconnecting nut 27 from the terminal fitting 29 and removing the pin 50 which connects the fitting 49 to the link 23. The retaining ring 31 may then be withdrawn to permit access to the sealing ring 52.

Means are provided for injecting air under pressure into either end of the power cylinder 37 and, as shown in the drawings, this means includes a spear tube 53 which extends into the bore 54 of the hollow piston rod or thrust tube 48. The spear tube 53 carries a pair of seal rings 55 which are mounted between annular collars 56 and the end cap 57 brazed to the tube 53. Axially spaced from the seal rings 55 are similar rings 58 mounted between annular collars 59 likewise brazed on the tube 53. The seal rings 55 and 58 engage the bore 54 of the thrust tube 48 in sliding relationship and define the ends of an annulus 60 between the spear tube 53 and the thrust tube 48. Lateral ports 61 are provided through the wall of the tube 53 adjacent outer seals 55 to establish communication between the interior of the tube 53 and the annulus 60. Similarly, ports 62 are formed through the wall of the thrust tube 48 to establish communication from the annulus 60 into the chamber 100 on one side of the piston 39.

The spear tube 53 is secured to the fluid injection element 63 by any convenient means, such as by threads 99. This connection element 63 is in turn threaded into the collar 64, brazed at 65 into an opening in the end flange 34. The opening 101 into which the fluid injection element 63 is threaded is hereinafter referred to as an entrance opening. A conical seating surface 66 is provided within the collar 64 and is adapted to form a sealing engagement within the corresponding conical seal 67 formed on the exterior of fluid injection element 63. A fluid passageway 68 formed in the element 63 communicates with the interior of the spear tube 53, while a second passageway 69 in the element 63 communicates with the chamber 100 within the cylinder 37 at the rear of the piston 39. It will be apparent from this description of the apparatus that air injected into the spear tube 53 passes through ports 61 and then through port 62 into the chamber 100 on the front side of the piston 39. Similarly, air injected through the passageway 69 into the chamber 100 enters the chamber 100 on the rear side of the piston 39. By controlling the injection and discharge of air through the passageways 68 and 69, the operation of the piston 39 within the cylinder 37 is controlled.

As shown in the drawings, the means for controlling admission and exhaust of air through the passageways 68 and 69 comprises a valve assembly generally designated 11. This assembly includes a pair of longitudinally extending conduits 70 and 71, communicating with the passageways 68 and 69 respectively, and with the ports 72 and 73 respectively, formed in the wall of the valve housing 74. A transverse cylindrical bore 75 in the housing 74 is adapted to receive axially spaced sealing cups 76 and 77. A spacer sleeve 78 maintains the sealing cups 76 and 77 in axially spaced relationship on the axial valve stem 79. A nut 80 threaded on one end of the valve stem cooperates with the spacers 81 and 82 to clamp the cups 76 and 77 between the nut 80 and the shoulder 83 on the valve stem. A guide bushing 84 is threaded on one end of the cylindrical bore 75 and a cap element 85 is threaded into the other end of the bore 75. A coil spring 86 is confined between the cap element and the spacer 82 and normally acts to maintain the valve assembly in the position shown in Figure 2 in which the spacer 81 is in contact with the guide bushing 84. In such position, air admitted through the hose 35 into the air inlet 86a passes through the inlet port 87 leading into the bore 75. The air then passes through the port 73 and into the conduit 71 for admission into the chamber 100 by way of the passageway 69. As the piston 39 moves toward the front end of the power cylinder 37 by reason of the air pressure pushing it, the air within the power cylinder and in front of the moving piston is exhausted by passing into the annulus 60 by way of the port 62 and then into the interior of the spear tube 53 by way of the port 61. The air thus being discharged passes outwardly through the passageway 68, tube 70, port 72 and into the bore 75 of the valve housing 74 between the sealing cup 76 and the cap 85. The air is then exhausted to the atmosphere through the vent 87a.

The projecting end 88 of the valve stem 79 may be moved inwardly until the end of the valve stem 79 strikes cap 85 as a stop element. In this latter position (not shown) the air inlet port 87 communicates with port 72, while port 73 is placed in communication with the vent 89. The air serves to drive the piston 39 towards the rear of the power cylinder 37, thereby exhausting air through the passageway 69, tube 71, port 73, vent 89, and vent channel 98 in the handle 90.

Handle means are provided for convenient manual gripping of the device and for convenient actuation of the valve stem 79. This means may include a split molded handle 90 formed of two complementary halves adapted to enclose the tubes 70 and 71 and the valve housing 74. Fastener element 91 may be provided for maintaining the halves of the handle 90 in assembled relation. A lever 92 of rounded shape conforming to the contour of the hand is pivotally connected to the handle 90 at 93. The proportions of the parts are such that the handle 90 and the lever 92 may be grasped in one hand and upon squeezing motion of the hand, the lever 92 pivots about the pin 93 to move the projecting end 88 of the valve stem 79 toward the cap 85. Such action results in changing the communication of the ports in the manner just described.

The bore 75 of the valve housing 74 and the guide bushing 84 and cap 85 are so proportioned that the moving parts of the valve assembly may be inserted into the opposite end of the bore 75. Such an arrangement is shown in Figure 3. The coil spring 86 then normally maintains the parts in such position that the inlet port 87 communicates with the port 72, while the port 73 is in communication with the vent 89. The split handle 90 may also be reversed in its position to enable the lever 92 to coact with the projecting end 88 of the valve stem 79. The reversal of the operating parts of the valve 11 provides a construction in which the piston 39 remains at the rear end of the power cylinder 37 until the valve is actuated. In other words, the blades 13 and 15 of the shear may be held normally open, or normally closed, by inserting the operating parts of the valve into the alternate ends of the bore 75.

An important feature of my invention lies in the fact that the packing means for injecting air into the power cylinder 37 on opposite sides of the piston 39 may be bodily removed as a unit with the spear tube 53 and valve assembly 11. When the seal rings 55 and 58 become worn in service, they may be easily replaced by simply unscrewing the injection fitting 63 from the collar 64 and withdrawing the spear tube 53 outwardly through the entrance opening 66, and when disassembled from the cylinder 37, the seal rings 55 and 58 may be replaced in an obvious manner.

In operation, the power driven pruning shear embodying my invention may be manually actuated by an operator, not shown, who grasps the sleeve 32 in one hand and lever 92 in the other hand. Squeezing motion applied to the lever 92 controls the admission and exhaust of air relative to the actuator 10 in the manner described above, with the result that the shear blade 15 is opened and closed in response to the position of the lever 92. Thus, by squeezing the handle 90 and the lever 92, the movable shear blade 15 is driven toward its closed position. By relaxing the grip on the lever 92, the air pressure is admitted into the forward end of the actuator 10, thereby moving the blade 15 to its open position under power. It will be observed that the valve 11 may be manually operated conveniently irrespective of the angular position of the device about the longitudinal axis of the power cylinder. This is an advantageous feature since it promotes easy handling of the device to bring the pruning shear blades into any desired cutting position. Since power may be applied to both directions of movement of the shear blades, they may both cut and release under power.

Another feature of this invention concerns the disconnect arrangement provided by the elements 27 and 29. By unthreading the element 27 from the threads 28 and removing the pin 24, the pruning shear device may be removed and any other desired tool may be substituted therefor.

The relatively short length of hose 35 is provided at the back end of the valve assembly 11 in order that the connection fitting 36 may be located away from the valve assembly 11. An operator may thus set the whole device down on the ground momentarily when disconnected from the air supply (not shown) without risk of dirt or other foreign matter entering the air inlet.

Resilient bumper blocks 94 are mounted in opposite ends of the power cylinder 37 to decelerate the piston 39 at each end of its stroke. These bumper blocks or cushions 94 engage the plates 41 and thus decelerate the piston 39 without contacting the resilient cups 40. The cushions 94 may be provided with relief channels 102, if desired, in order to present maximum effective area to the air under pressure at the start of the travel of the piston 39 in either direction.

Figure 8:
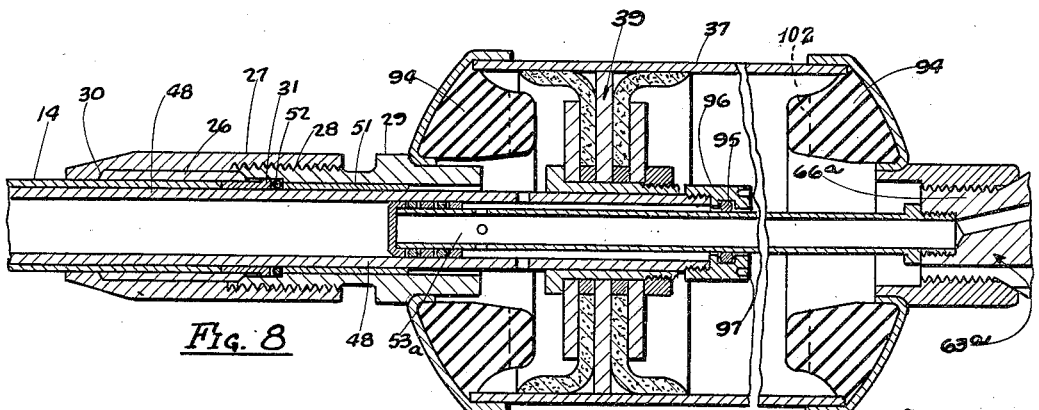
Figure 8 is a sectional view similar to Figure 4, but illustrating a modified form of sealing means for the fluid injection assembly.

In the modified form of the invention illustrated in Figure 8, the spear tube 53a is provided with only one set of sealing elements 55. The seal at the rear of the piston assembly is provided by seal ring 95, carried by the collar 96, threaded on the end of the thrust tube 48. This seal ring 95 slidably engages the exterior surface of the spear tube 53a. The diameter of the collar 96 is such that, upon being unthreaded from the thrust tube 48, it may pass outwardly through the entrance opening 66a. Recesses 97 are provided in the end face of the collar 96 for the purpose of facilitating unthreading of the collar after the fluid injection element 63a and spear tube 53a have been partially withdrawn.

The principal advantage of this modified construction is that the sleeve extension may be made considerably shorter, or eliminated entirely, and hence the overall length of the pneumatic actuator may be held to a minimum. In other respects this form of the invention is substantially the same as that previously described, and it has the same mode of operation.

Having fully described my invention, I declare that it is not to be construed as limited to the details herein set forth, but is of the full scope of the appended claims.

I claim:

1. A fluid driven actuator comprising in combination a power cylinder having a piston longitudinally reciprocable therein, an axial entrance opening in one end of the power cylinder, a reciprocable thrust tube extending through the other end of the power cylinder and secured for movement with said piston, a stationary spear tube insertable axially through said entrance opening into the bore of the thrust tube, the spear tube being closed at its projecting end, axially spaced sealing means carried on the spear tube and contacting the bore of the thrust tube in slidable sealing relation, a first port in the wall of the spear tube between said spaced sealing means, a second port in the wall of the reciprocable thrust tube in communication with the first port, and releasable means for securing the spear tube in fluidtight relation within the entrance opening.

2. A fluid driven actuator comprising in combination a power cylinder having a piston longitudinally reciprocable therein, an axial entrance opening in one end of the power cylinder, a reciprocable thrust tube extending through the other end of the power cylinder and secured for movement with said piston, a stationary spear tube insertable axially through said entrance opening into the bore of the thrust tube, the spear tube being closed at its projecting end, axially spaced sealing means carried on the spear tube and contacting the bore of the thrust tube in slidable sealing relation, releasable means for securing the spear tube in fluid tight relation within the entrance opening, means whereby a fluid under pressure may be introduced through the spear tube into the annular space between said spaced sealing means, and a port in the wall of the reciprocable thrust tube adapted to establish communication between said annular space and the interior of said power cylinder on one side of the piston.

3. A fluid driven actuator comprising in combination a power cylinder having a piston longitudinally reciprocable therein, a stationary tubular sleeve projecting axially from one end of the power cylinder and having a sealed connection with respect thereto, an axial entrance opening in the other end of the power cylinder, a bearing axially positioned in the projecting end of the sleeve, a reciprocable thrust tube slidable in the bearing and secured for movement with said piston, fluid supply means for introducing fluid under pressure into the power cylinder on either side of said piston, said means including a stationary spear tube insertable axially through said entrance opening into the bore of the thrust tube, the spear tube being closed at its projecting end, port means establishing communication between the interior of the power cylinder on one side of the piston and the interior of the spear tube, an element secured to the thrust tube adapted to be received in fluidtight relation within the entrance opening, passage means in said element leading to the interior of the power cylinder on the other side of the piston, and selectively operable valve means adjacent said element adapted to introduce fluid under pressure into the spear tube or into said passage means.

4. A fluid driven actuator comprising in combination a power cylinder having a piston longitudinally reciprocable therein, a stationary tubular sleeve projecting axially from one end of the power cylinder and having a sealed connection with respect thereto, an axial entrance opening in the other end of the power cylinder, a bearing axially positioned in the projecting end of the sleeve, a reciprocable thrust tube slidable in the bearing and secured for movement with said piston, means whereby the thrust tube may operate a driven mechanism, a fluid supply element removably received in said entrance opening, said element including a stationary spear tube insertable axially into said entrance opening into the bore of the thrust tube, the spear tube being closed at its projecting end and provided with packing means near said projecting end adapted to engage the bore of the thrust tube, passage means associated with said element and said thrust tube for introducing fluid under pressure into either end of the power cylinder, and selectively operable valve means adjacent said element adapted to regulate flow of fluid through said passage means.

5. A fluid driven actuator comprising in combination a power cylinder having a piston longitudinally reciprocable therein, an axial entrance opening in one end of the power cylinder, a reciprocable thrust tube extending through the other end of the power cylinder and secured for movement with said piston, a fluid supply element removably received in said entrance opening, said element including a stationary spear tube insertable axially into said entrance opening into the bore of the thrust tube, the spear tube being closed at its projecting end and provided with packing means near said projecting end adapted to engage the bore of the thrust tube, passage means associated with said element and said thrust tube for introducing fluid under pressure into either end of the power cylinder, and selectively operable valve means adjacent said element adapted to regulate flow of fluid through said passage means.

6. A fluid driven actuator comprising in combination a power cylinder having a piston longitudinally reciprocable therein, a hollow piston rod secured to the piston and extending axially through one end of the power cylinder, means at the projecting end of the piston rod for actuating a driven mechanism, an axial entrance opening in the other end of the power cylinder, a fluid injection element removably received in said opening, passage means associated with said element for introducing fluid under pressure into either end of the power cylinder, said passage means including a spear tube telescopically received within the hollow piston rod, the spear tube being closed at its projecting end and provided with packing means near said projecting end adapted to engage the bore of the thrust tube, valve means adjacent said element adapted to control flow of fluid through said passage means, and means for supplying fluid under pressure to said valve.

7. A fluid driven actuator comprising in combination a power cylinder having a piston longitudinally reciprocable therein, a stationary tubular sleeve projecting axially from one end of the power cylinder and having a sealed connection with respect thereto, a bearing axially positioned in the projecting end of the sleeve, an axial entrance opening in the other end of the power cylinder, a reciprocable thrust tube slidable in the bearing and secured for movement with said piston, a stationary spear tube insertable axially through said entrance opening into the bore of the thrust tube, the spear tube being closed at its projecting end axially spaced sealing means carried on the spear tube and contacting the bore of the thrust tube in slidable sealing relation, at least one of said sealing means being positioned radially inwardly of said sleeve, a first port in the wall of the spear tube between said spaced sealing means, a second port in the wall of the reciprocable thrust tube in communication with the first port, and releasable means for securing the spear tube in fluidtight relation within the entrance opening.

8. In a fluid driven actuator, the combination of a power cylinder, a piston reciprocable in the cylinder, a hollow piston rod secured to the piston and extending through one end of the power cylinder, an entrance opening axially positioned in the other end of the power cylinder, means for injecting fluid under pressure into either end of said power cylinder, said means including a fluid injection element position in said entrance opening, and having first and second passageways associated therewith communicating with the interior of the power cylinder on opposite sides of the piston, the second passageway extending through a stationary axial tube telescopically received in said hollow piston rod, said tube being closed at its projecting end and being provided with packing near said projecting end adapted to engage the interior of the hollow piston rod, valve means associated with said element provided with a fluid inlet port and a fluid outlet port, the valve means being selectively operable to direct fluid from the inlet through the first passageway and connect the second passageway to the outlet port, or to direct fluid from the inlet through the second passageway and connect the first passageway to the outlet port.

9. In a fluid driven actuator, the combination of a power cylinder, a piston reciprocable in the cylinder, a hollow piston rod secured to the piston and extending through one end of the power cylinder, an entrance opening axially positioned in the other end of the power cylinder, a stationary tube insertable through the entrance opening into telescopic relation with the hollow piston rod, the tube being closed at its projecting end, means carried on the tube near its projecting end adapted to form a sliding seal with the interior of the hollow piston rod, sealing means carried by the piston slidable on said tube, and ports in the tube and hollow piston rod establishing communication between the interior of the power cylinder and the interior of the tube.

10. In a fluid driven actuator, the combination of a power cylinder, a piston reciprocable in the cylinder, a hollow piston rod secured to the piston and extending through one end of the power cylinder, an entrance opening axially positioned in the other end of the power cylinder, a stationary tube closed at its projecting end and insertable through the entrance opening into telescopic relation with the hollow piston rod, means carried on the tube near its projecting end adapted to form a sliding seal with the interior of the hollow piston rod, sealing means carried by the piston slidable on said tube, cooperating ports in the tube and hollow piston rod adapted to establish communication between the interior of the power cylinder on one side of the piston and the interior of the tube, an element fixed on the tube and removably received within the entrance opening, said element having passage means extending therethrough in communication with the interior of the power cylinder on the other side of the piston.

11. In a fluid driven actuator, the combination of a power cylinder, a piston reciprocable in the cylinder, a hollow piston rod secured to the piston and extending through one end of the power cylinder, an entrance opening axially positioned in the other end of the power cylinder, a stationary tube closed at its projecting end and insertable through the entrance opening into telescopic relation with the hollow piston rod, means carried on the tube near its projecting end adapted to form a sliding seal with the interior of the hollow piston rod, sealing means carried by the piston slidable on said tube, cooperating ports in the tube and hollow piston rod adapted to establish communication between the interior of the power cylinder on one side of the piston and the interior of the tube, an element fixed on the tube and removably received within the entrance opening, said element having passage means extending therethrough in communication with the interior of the power cylinder on the other side of the piston, and valve means adjacent said element selectively operable to control flow of fluid through the tube and passage means.

12. In a fluid driven actuator, the combination of a power cylinder, a reciprocable member in said cylinder comprising a piston and a hollow piston rod secured thereto, the piston rod extending through one end of the power cylinder, an entrance opening axially positioned in the other end of the power cylinder, a stationary tube closed at its projecting end and insertable through the entrance opening into telescopic relation with the hollow piston rod, means carried on the tube near its projecting end adapted to form a sliding seal with the interior of the hollow piston rod, sealing means carried by the reciprocable member slidable on said tube, and cooperating ports in the tube and hollow piston rod adapted to establish communication between the interior of the power cylinder and the interior of the tube.

13. In a pneumatic actuator, the combination of a power cylinder, a piston reciprocable in the cylinder, unitary means for injecting a pneumatic fluid into either end of the power cylinder, said unitary means including a stationary tube extending axially through the piston in telescopic relation, a fluid supply conduit, valve means operatively interposed between the supply conduit and said stationary tube and forming therewith a unitary assembly releaseably connected to the power cylinder, inlet means for the valve in axial alignment with said stationary tube, a valve housing having a bore extending transversely of the tube axis, a vent port associated with said valve means, and a valve element slidably mounted in the transverse bore and selectively operable to place the stationary tube in communication with either the inlet means or the vent port.

LEONIDAS C. MILLER.

REFERENCES CITED

The following references are of record in the file of this patent:

UNITED STATES PATENTS

| Number | Name | Date |
| --- | --- | --- |
| 298,224 | Morgan | May 6, 1884 |
| 421,150 | Whittier | Feb. 11, 1890 |
| 679,767 | Mears | Aug. 6, 1901 |
| 975,314 | Baker | Nov. 8, 1910 |
| 1,113,711 | Strand | Oct. 13, 1914 |
| 1,223,741 | Schwister | Apr. 24, 1917 |
| 1,292,013 | Munger | Jan. 21, 1919 |
| 1,331,353 | Nurnberger | Feb. 17, 1920 |
| 1,538,194 | Levedahl | May 19, 1925 |
| 1,764,911 | Treat | June 17, 1930 |
| 1,825,290 | Stevens | Sept. 29, 1931 |
| 2,075,341 | Goodman | Mar. 30, 1937 |
| 2,171,029 | Geldhof | Aug. 29, 1939 |
| 2,307,067 | Paulus | Jan. 5, 1943 |
| 2,314,444 | Crittenden | Mar. 23, 1943 |
| 2,345,837 | Smith | Apr. 4, 1944 |
| 2,354,841 | Shaff | Aug. 1, 1944 |
| 2,366,121 | Hurst | Dec. 26, 1944 |
| 2,366,909 | Johnson | Jan. 9, 1945 |

FOREIGN PATENTS

| Number | Country | Date |
| --- | --- | --- |
| 689,670 | France | June 2, 1930 |